UNITED STATES PATENT OFFICE.

STUART GWYNN, OF NEW YORK, N. Y.

IMPROVEMENT IN THE MANUFACTURE OF OPAQUE PIGMENTS.

Specification forming part of Letters Patent No. 51,584, dated December 19, 1865; antedated December 5, 1865.

*To all whom it may concern:*

Be it known that I, STUART GWYNN, of New York, in the county and State of New York, have invented certain new and useful Pigments, which I call "opaque pigments" because the process of their manufacture renders them far more opaque than any hitherto made from the same substances; and I hereby declare that the following is a full, clear, and exact description of the methods and manipulations required to produce the opaque pigments, samples of which accompany the specification.

Drawings, models, and description of the machinery and apparatus in which I make them will be given on my applications at a future time, for one or more patents, this application being for the opaque pigments as a new article of manufacture.

In 1863, at the request of the then Secretary of the United States Treasury, I began an extended series of experiments, (at my own cost,) with a view to improve the quality of inks for plate-printing the Treasury issues. The first work was a careful chemical and microscopic analysis of the pigments then used as a basis for the inks. Of all nations the Chinese had, up to this time, produced the most brilliant and opaque pigments. My examinations revealed the cause of this superiority. It was long-continued grinding in water. Like treatment produced in pigments of my make like results. Thus I treated zinc-white, Prussian blue, chrome and other green and yellow pigments, vermilion, carmine, lamp-black, and other carbon pigments, &c. Their brilliancy increased, and so did their opacity. My next inquiry was, "How does this structural change by grinding effect their relative gravity?" It was increased, to my surprise. Renewed microscopic examinations with polarized light revealed how this seeming anomaly could be reconciled with the facts. I examined pigments prepared by sublimation, such as zinc-white precipitated by double decomposition, such as chrome colors and Prussian blue; by corrosion, such as white leads; eliminated from the animal kingdom, such as carmine, and from inorganic matter, such as the analine colors from coal-tar, &c. I now sought to make pigments as opaque and brilliant as obtained by long-continued grinding by chemical manipulation. In this I only met a partial success. Boiling in acids, alkalies, and in solutions of neutral salts, oils, and in water under a vacuum, &c., as the nature of the crude pigment admitted of, gave only partial results. Heat by water and steam baths, oil-baths, metallic baths, (in furnaces and muffles,) superheated steam, (the latter up to 1,000° of Fahrenheit,) and finally up to the extreme heat obtained from the oxyhydrogen blow-pipe, (this latter, of course, decomposing all but the most refractory pigments,) was tried, but no result was reached equal to grinding. Almost in despair of discovering a method of manufacture suitable for large quantities of pigment, I resorted to a series of experiments on condensation by combined chemical and mechanical concentration of the atoms composing the pigments in their raw or normal state. The first results were not satisfactory, but samples obtained by bringing into use machinery, apparatus, and manipulations based on established facts (which I had used in preparing artificial fuels in England in 1851 and 1852) determined me to continue my experiments, and the results finally attained are almost wonderful, as will be self-evident on an examination of the samples as produced by my process if they be compared with pigments found in commerce of identical chemical characters.

The methods I now prefer and employ are, viz: I prepare a bath of oil or other suitable fluid by and in proper apparatus. I prefer superheated steam, in which I can stir and heat the pigments which are to be rendered opaque, (by a change of atomic structure,) injecting into them at the same time, if required, heated air, gases, vapors, or fluids, as the nature of the crude or normal pigments require, thus expelling or changing the nature of the gaseous and other impurities and bringing the atoms of the pigments into conditions that fit them for the further operations necessary to render them opaque, in which state they more readily mix and form chemical compounds with oils, &c. The required heat will vary with the pigment that is to be prepared. Carmine requires the least—say 100° Fahrenheit—while some require 1,000° or more. Oxide of zinc I treat at about 500°; if much above that it rapidly becomes yellow. The carbon colors require about 600°. Sulphate and carbonate of lead require about 800°, and the iron oxides and some other metallic paints about 1,000° or over. Practice will enable the expert, after a few tests, to obtain with certainty the best results. The pigment is now removed to the proper apparatus—pneumatic, hydrostatic, or mechanical, (I prefer the two former,) and subjected to a concentrating power of from two to eight tons per inch of area. This concentration is effected either in elastic bags contained in suitable apparatus or in very strong cylindrical vessels or in open-ended steel tubes, (I generally prefer the latter,) out of the open end of which the pigment spins like phosphorous or maccaroni.

Having described in manner that will enable an expert to produce opaque colors or pigments by my methods, what I claim is—

The methods of making opaque pigments (producing in the normal pigments a structural change, thereby altering their mechanical qualities and freeing them from gaseous and other impurities) by means substantially the same as I have described, and which constitutes them a new article of manufacture.

STUART GWYNN.

Witnesses:
SAMUEL C. HART,
C. ALLEN BROWNE.